No. 700,798. Patented May 27, 1902.
J. MORRIS, Jr.
COUPLING FOR HOSE PIPES, &c.
(Application filed July 2, 1901.)
(No Model.) 4 Sheets—Sheet I.
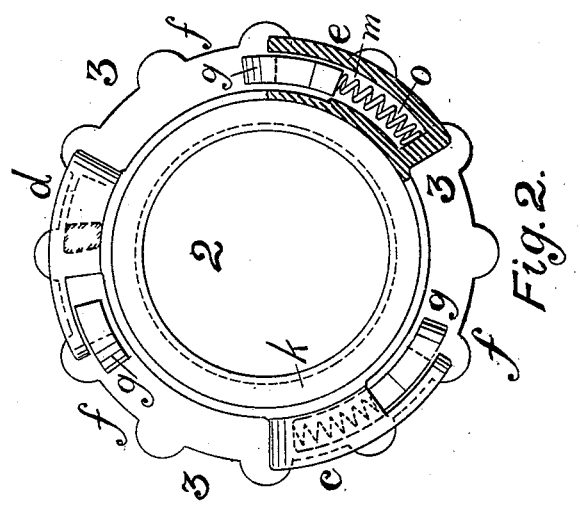
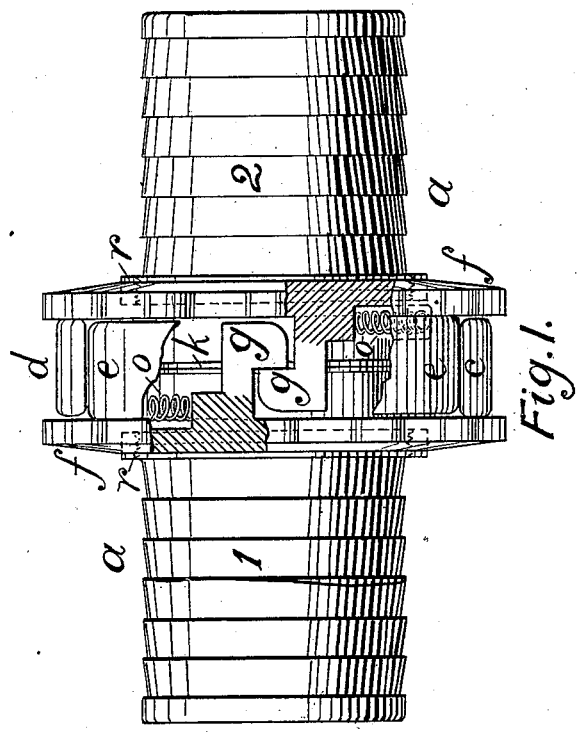
WITNESSES.
Joseph Bates.
E. Howard.
INVENTOR.
John Morris Jr.
by J. Owam O'Brien
atty.

No. 700,798. Patented May 27, 1902.
J. MORRIS, Jr.
COUPLING FOR HOSE PIPES, &c.
(Application filed July 2, 1901.)
(No Model.) 4 Sheets—Sheet 2.
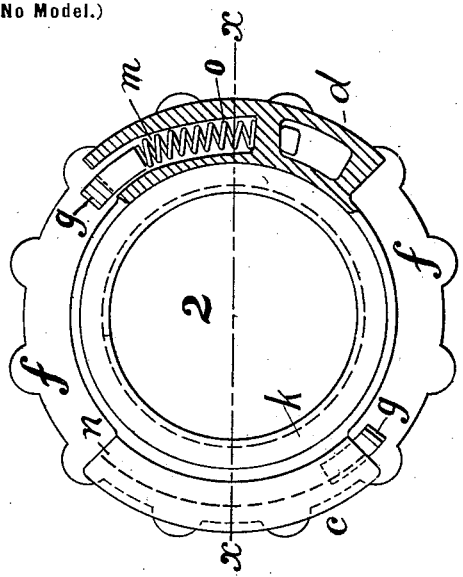
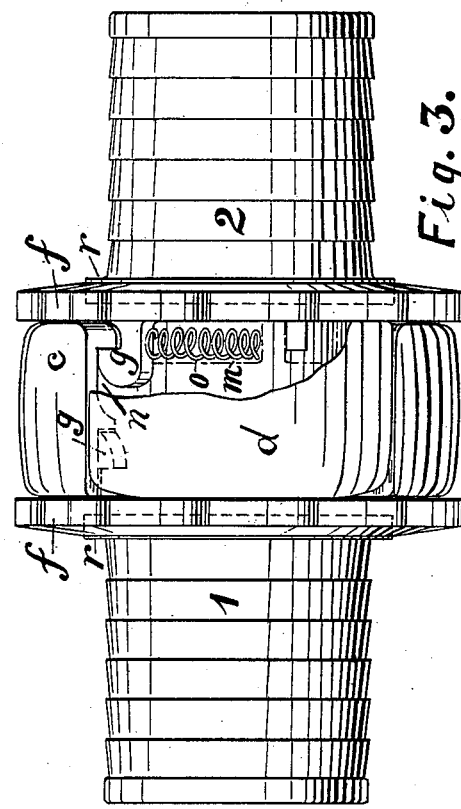
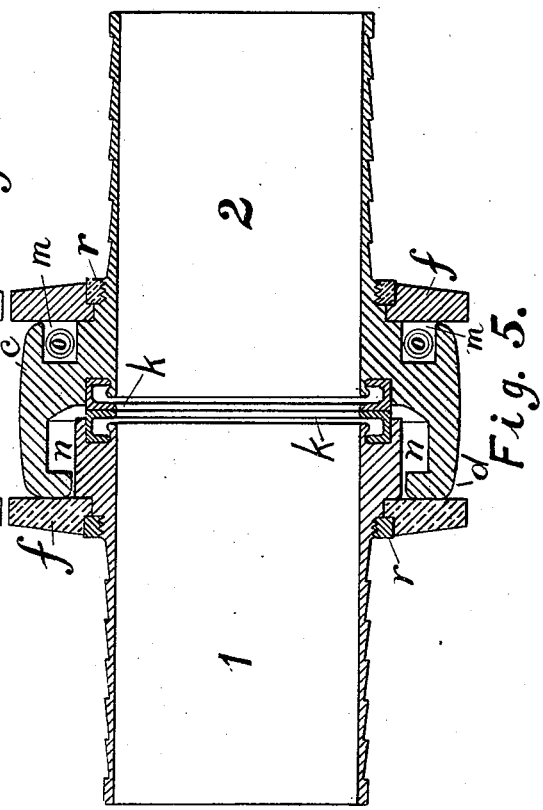
WITNESSES.
Joseph Bates.
E. Howard.
INVENTOR.
John Morris Jr.

No. 700,798. Patented May 27, 1902.
J. MORRIS, JR.
COUPLING FOR HOSE PIPES, &c.
(Application filed July 2, 1901.)
(No Model.) 4 Sheets—Sheet 3.
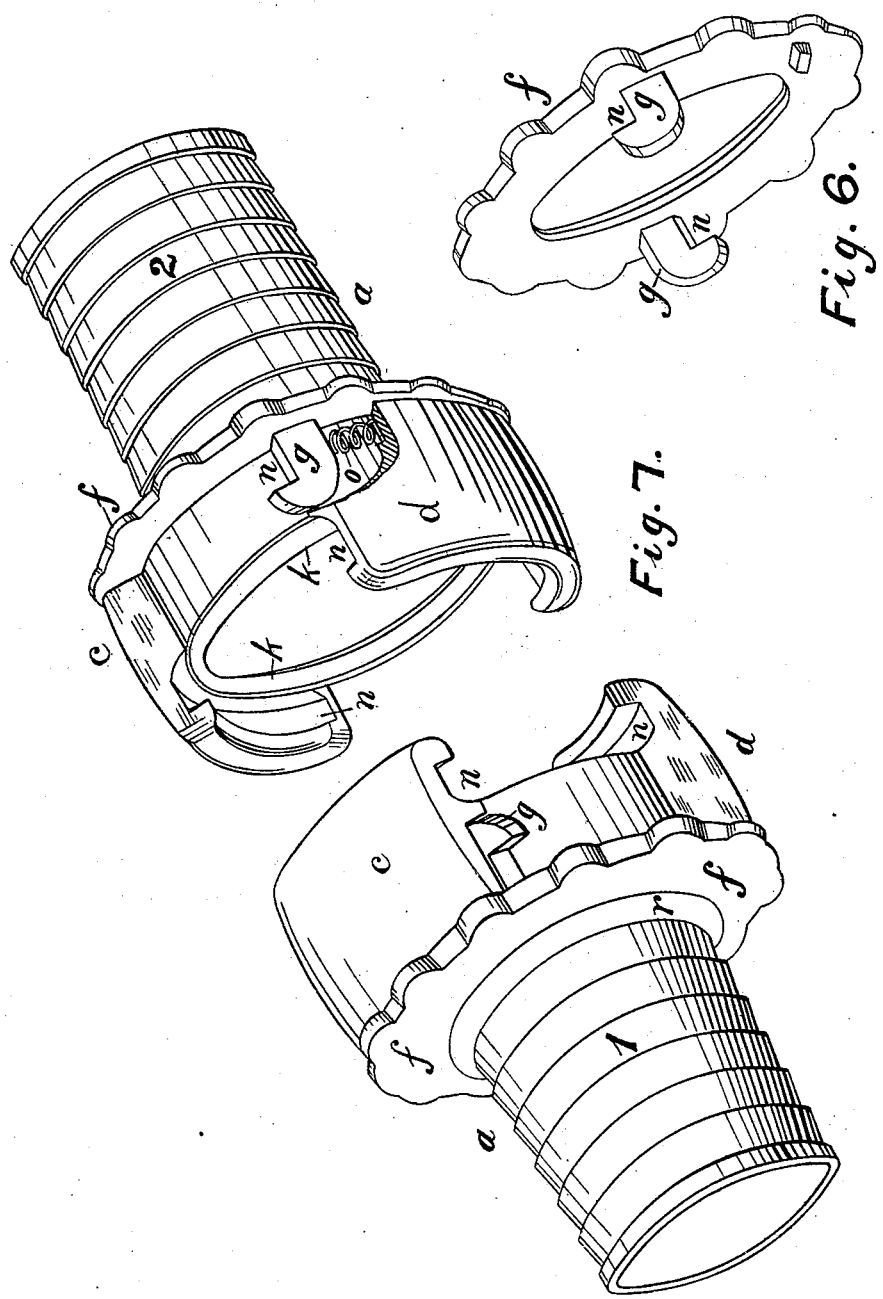
WITNESSES.
Joseph Bates.
E. Howard
INVENTOR.
John Morris Jr.
By O. Waen O'Brien
atty No. 700,798. Patented May 27, 1902.
J. MORRIS, Jr.
COUPLING FOR HOSE PIPES, &c.
(Application filed July 2, 1901.)
(No Model.) 4 Sheets—Sheet 4.
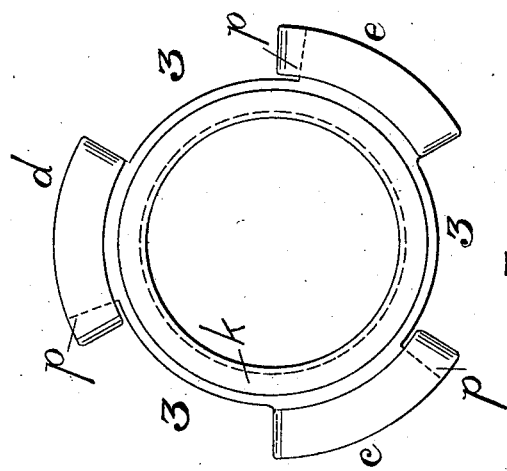
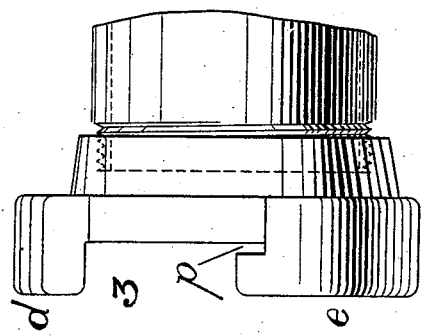
WITNESSES.
Joseph Bates.
E. Howard.
INVENTOR.
John Morris Jr.
by Edward O'Brien
atty

UNITED STATES PATENT OFFICE.

JOHN MORRIS, JR., OF ECCLES, ENGLAND.

COUPLING FOR HOSE-PIPES, &c.

SPECIFICATION forming part of Letters Patent No. 700,798, dated May 27, 1902.

Application filed July 2, 1901. Serial No. 66,880. (No model.)

*To all whom it may concern:*

Be it known that I, JOHN MORRIS, Jr., fire-engineer, a British subject, and a resident of Eccles, in the county of Lancaster, England, have invented certain new and useful Improvements in Couplings for Hose-Pipes and other Pipes and Tubes, of which the following is a specification.

This invention has reference to improvements to that class of hose or pipe couplings in which both parts of the coupling are made precisely alike and are known as "symmetrical couplings," so that a length of hose or other pipes or tubes provided at their ends with such half-couplings can be connected together by either end indiscriminately.

It consists, essentially, in constructing a pipe-coupling in two similar parts, each section or part of which with two, three, or more lugs or projections to engage with corresponding lugs on the other part and a movable ring or collar carrying the grip-latches, which project from the sides of the lugs, such rings being placed behind the projections and capable of being partially rotated thereon, so that the latch or latches of one part of the coupling may when the two parts are brought together engage the other part, a spring or springs being inserted to move the collars in one direction to render the locking automatic.

The invention will be fully described with reference to the accompanying drawings.

Figure 1 is a side elevation, partly in section, of coupling with three lugs, showing the parts engaged and locked together; Fig. 2, a front elevation of one part of same, partly in section; Fig. 3, a side elevation, partly in section, of coupling with two lugs, the parts being engaged and locked together; Fig. 4, a front elevation, partly in section, of Fig. 3; Fig. 5, a longitudinal section on line $xx$, Fig. 4; Fig. 6, a perspective view of the movable catch-ring; Fig. 7, a perspective view of coupling with two lugs, showing the parts apart; Fig. 8, a side elevation of coupling for fixed position; Fig. 9, a front elevation of same, Fig. 8.

The two coupling halves or sections 1 and 2, forming the coupling, are of precisely similar construction and are each built up of four main parts, the body $a$ of the coupling with two or three or more lugs $c\ d\ e$, a collar or ring $f$, fitted to move or rotate behind the projecting lugs and carrying two or three or more latches $g$, a nut or washer $r$, fitted behind the movable collar or ring $f$ to hold it in position, and a rubber washer $k$ on the face of the joint.

The body $a$ of the coupling and the lugs $c$, $d$, and $e$ are cast or formed in one piece, with spaces 3 between the lugs complementary to and corresponding to the lugs into which the lugs fit when the two parts 1 and 2 of the coupling are brought together.

In the back of the lugs $c$, $d$, and $e$ are formed grooves or recesses $m$, into which the latches $g$ on the ring or collar $f$ project. The end of each latch $g$ projects out from the edge of the lug into which it is fitted, and the latches $g$ are capable of being moved to and fro within a limited distance in the grooves or recesses $m$.

In the arrangement shown in Figs. 1 and 2 the latch $g$ projecting from the edge or face of the collar or ring engages with the latch $g$ projecting from the face of the adjacent collar.

In the arrangement shown in Figs. 3 and 4, 5, and 7 the edge of the lug is provided with a notch $n$, with which the latch projecting from the opposite lug engages.

The collar or ring $f$ is placed over the base of the couplings, and the latches $g$ project from the face, (see Fig. 6,) the latches $g$ being beveled or inclined at front, so that they may be readily forced backward when pressure is brought against them in the reverse direction. A spring $o$ is inserted in the recesses $m$ behind the latches $g$ to maintain them in normal position.

In Figs. 3, 4, 5, and 7 notches $n$ are formed in the edges of the lugs $c$ and $d$, with which the latches engage when the parts 1 and 2 of the coupling are brought together, or the latches $g$ may be arranged, as in Figs. 1 and 2, to engage with one another.

The nut $r$ is screwed on behind the collar and retains it in position without retarding its movement around the coupling.

When the two parts 1 and 2 of the coupling are brought together, the rubber washers k, fitted in the interior, make a water-tight joint.

To connect the coupling, the two parts 1 and 2 are simply pressed together, the lugs c, d, and e of one entering into the spaces 3 between the lugs c, d, and e of the other, and the latches g are forced back and then spring out and engage either with one another or in the notches n, locking the parts 1 and 2 firmly together.

To disconnect the coupling, the collars are rotated in a reverse direction until the latches g are clear of each other or of the notches n, when the two parts can be drawn asunder. A coupling for fixed positions—such as delivery-outlets on stand-pipes, hydrants, pumps, hand-pipes, nozzles, or the like—as shown in Figs. 8 and 9, is made in a similar manner, but without the latches g, notches p being provided for the latches g on the hose-coupling to engage.

By this construction I am enabled to produce a symmetrical automatic hose or pipe coupling without laterally-projecting lugs or other obstructions of any kind and one which can be quickly connected and disconnected.

What I claim as my invention, and desire to protect by Letters Patent, is—

1. A coupling for hose and pipes comprising in its construction a body, a number of lugs projecting therefrom, a revolving collar placed behind the body, a number of latches operated by said collar to engage the opposite part of the coupling and springs to move said collar in one direction, substantially as described.

2. In a coupling for hose and pipes the combination with the body a and a number of lugs projecting longitudinally therefrom provided with recesses m in their base, of a movable ring f to which the latches g are attached and springs o placed behind the latches g in the recesses m to operate them substantially as described.

In witness whereof I have hereunto signed my name in the presence of two subscribing witnesses.

JOHN MORRIS, JR.

Witnesses:
J. OWDEN O'BRIEN,
FRANK SPARKES.